United States Patent
Thery et al.

(10) Patent No.: US 9,088,041 B2
(45) Date of Patent: Jul. 21, 2015

(54) FUEL CELL COMPRISING A PLURALITY OF BASIC CELLS CONNECTED IN SERIES, AND METHOD FOR MANUFACTURING SAME

(75) Inventors: Jessica Thery, Fontaine (FR); Delphine Boutry, Vinay (FR); Vincent Faucheux, Lans en Vercors (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 379 days.

(21) Appl. No.: 13/812,322

(22) PCT Filed: Jul. 1, 2011

(86) PCT No.: PCT/FR2011/000384
§ 371 (c)(1),
(2), (4) Date: Jan. 25, 2013

(87) PCT Pub. No.: WO2012/013867
PCT Pub. Date: Feb. 2, 2012

(65) Prior Publication Data
US 2013/0122392 A1    May 16, 2013

(30) Foreign Application Priority Data
Jul. 27, 2010 (FR) ..................................... 10 03153

(51) Int. Cl.
*H01M 8/24* (2006.01)
*H01M 8/10* (2006.01)
*H01M 8/02* (2006.01)

(52) U.S. Cl.
CPC ............ *H01M 8/241* (2013.01); *H01M 8/0202* (2013.01); *H01M 8/1097* (2013.01); *H01M 8/24* (2013.01); *H01M 8/249* (2013.01); *H01M 8/2425* (2013.01); *Y02E 60/521* (2013.01)

(58) Field of Classification Search
CPC ............ H01M 8/10; H01M 8/24; H01M 2/02
USPC .......... 429/452–471, 507–511, 517–522, 535
See application file for complete search history.

(56) References Cited

U.S. PATENT DOCUMENTS

| | | | |
|---|---|---|---|
| 5,863,672 A | 1/1999 | Ledjeff et al. | |
| 2006/0051655 A1* | 3/2006 | Yoshitake et al. | 429/40 |

(Continued)

FOREIGN PATENT DOCUMENTS

| | | |
|---|---|---|
| CN | 1659736 A | 8/2005 |
| EP | 1 134 830 A2 | 9/2001 |

(Continued)

OTHER PUBLICATIONS

Nov. 2, 2014 Office Action Issued in Chinese Application No. 201180037046.5.
Wainright et al., "Microfabricated Fuel Cells," *Electrochimica Acta*, vol. 48, 2003, pp. 2869-2876.

*Primary Examiner* — Jonathan Crepeau
*Assistant Examiner* — Caitlin Wilmot
(74) *Attorney, Agent, or Firm* — Oliff PLC

(57) ABSTRACT

Adjacent elementary cells are connected in series by connecting elements, each of which is arranged in an interconnection area. The connecting elements are separated from the respective electrolytic membranes of the two adjacent cells to be connected thereby. In this way, they are never in contact with these electrolytic membranes. For one of the two cells, the connecting element is separated from the electrolytic membrane by an empty space, whereas for the other cell, it is separated from the electrolytic membrane by a thin barrier layer designed to act as buffer area for variations in volume of said membrane when the cell is in operation. The thin barrier layer is formed by a polymer material having a lower water absorption capacity than that of the polymer material constituting the electrolytic membrane of the cell.

12 Claims, 4 Drawing Sheets

(56) References Cited

U.S. PATENT DOCUMENTS

2008/0261088 A1 10/2008 Cha et al.
2009/0123803 A1 5/2009 Faucheux et al.

FOREIGN PATENT DOCUMENTS

| EP | 1 515 387 A1 | 3/2005 |
| EP | 2 061 114 A1 | 5/2009 |

* cited by examiner

FUEL CELL COMPRISING A PLURALITY OF BASIC CELLS CONNECTED IN SERIES, AND METHOD FOR MANUFACTURING SAME

BACKGROUND OF THE INVENTION

The invention relates to a fuel cell comprising a plurality of adjacent elementary cells as well as to a method for manufacturing such a fuel cell.

STATE OF THE ART

The voltage delivered by a unitary fuel cell, i.e. a fuel cell comprising a single elementary cell formed by an Electrode-Membrane-Electrode (or EME) assembly with associated current collectors, is in general not sufficient for use in the field of portable devices. Certain applications likely to use fuel cells as energy source do in fact require high voltages, for example more than a few volts. For this, a fuel cell comprising a plurality of elementary cells connected in series has to be used.

In commonplace manner, elementary cells are produced separately before being associated in series with one another. In the case of fuel cells made in the form of thin layers on a flat support (cells also called planar cells), the EME assemblies are generally produced separately on flat supports, cut one by one, and then associated in series with one another. Such a fabrication method is long and requires the addition of current collectors, which can be welded or stuck, on the anodes and cathodes of the assemblies to enable series connection of the cells.

In the article "Microfabricated fuel cells" (Electrochimica Acta 48 (2003) 2869-2877), J. S. Wainright et al. propose a fuel cell comprising a plurality of cells connected in series, formed on a porous nylon film arranged on alumina in which channels are drilled. The anodic current collectors are formed by ink-printing deposition. Furthermore, non-porous insulating polymer seals are placed between the anodic current collectors, and the rest of the cells are then fabricated. Series connection of the cells is performed by printing conducting ink. However, with this solution, the electrolytic membranes swell and lift-off from the substrate in a damp atmosphere (100% RH). This lift-off does however result in leakage and stopping of the cell. The weak mechanical strength of the membranes is linked on the one hand to a poor contact between the insulating seals and the anodic current collectors, thereby creating spaces, and on the other hand to a poor adherence of the electrolytic membranes on the insulating seals.

U.S. Pat. No. 5,863,672 describes a different fuel cell geometry enabling the elementary voltage to be artificially increased. As illustrated in FIG. 1, such a cell 1 is formed by several elementary cells 2 arranged next to one another. Each cell 2 comprises an assembly of an anode 3 and a cathode 4 arranged between an electrolytic membrane 5. Cells 2 are separated from one another by electrically insulating areas 6 and are connected to one another by electrically conducting connecting parts 7. Connecting parts 7 each comprise a central area 8 comprising first and second faces 8a and 8b respectively covered by first and second layers 9 and 10 each comprising one end in contact respectively with anode 3 of a first cell and cathode 4 of the cell adjacent to said first cell. Such a cell, and in particular connecting parts 7, are difficult to implement, in particular on a small scale. It also requires an assembly step of the assembly formed by the cells connected in series between several other elements, such as external current collectors and gas distribution plates arranged on each side of said assembly. Finally, problems of tightness still remain.

In patent application EP-A-1515387, a fuel cell comprises a solid electrolytic membrane common to several adjacent cells connected in series. Series connection of the cells is performed by means of perpendicular connecting elements connecting the current collector of a cell to the current collector of an adjacent cell. These connecting elements are arranged in the centre of pass-through holes arranged in the common solid electrolytic membrane. A seal is further located in the top part of each pass-through hole to cover the upper space separating the corresponding connecting element and the membrane.

All of the current solutions for series connection of elementary cells, without having recourse to cutting and sticking of said cells, are confronted with problems of mechanical strength:
- either at the level of the electrolytic membrane which lifts off,
- or at the level of the EME assemblies and more particularly of the membrane which has to have a too high minimum thickness to be compatible with high power densities.

Furthermore, for a given cell surface, the latter is shared between the surface occupied by the set of elementary cells ("active surface") and the surface occupied by the insulating areas and/or conducting areas ("inactive surface"). However, in the solutions proposed above, the part of "active surface" is relatively small and this part is smaller the larger the number of cells, which proves to be incompatible with applications targeting power supply of portable devices.

Patent application EP-A-2061114 proposes a simplified fabrication method of a fuel cell comprising a plurality of elementary cells connected in series by their current collectors. Thus, as illustrated in FIG. 2, a connecting element 11 designed to connect the first (for example anodic) current collector 12a of a cell in series with the second (for example cathodic) current collector 13b of an adjacent cell 2b, is arranged between the two adjacent cells 2a and 2b. It extends vertically first current collector 12a of cell 2a and is connected to second current collector 13b of cell 2b. It is furthermore in contact with each electrolytic membrane 5a and 5b of the two adjacent cells 2a and 2b and was made, before said electrolytic membranes 5a and 5b, from the same electrically conducting material as that forming part of the composition of current collectors 12a and 12b arranged on a porous substrate 14. Connecting element 11 moreover advantageously has a larger thickness than that of each electrolytic membrane 5a and 5b, which enhances the electric contact connection with second current collector 13b of cell 2b. References 3a and 3b in FIG. 2 represent the respective first electrodes of cells 2a and 2b (for example the anodes) and references 4a and 4b in FIG. 2 represent the respective second electrodes of cells 2a and 2b (for example the cathodes).

Although patent application EPA-2061114 enables the fabrication of series-connected elementary cells to be simplified, current techniques for depositing an electrolytic polymer material, such as spraying, screen printing or inkjet printing, do not enable localized depositions that are both fast and homogeneous to be made between the connecting elements. Moreover, the interconnection areas, corresponding in patent application EP-A2061114 to the areas comprising connecting elements 11, are subjected to high mechanical stresses when the electrolytic polymer material used to form electrolytic membranes 5a and 5b is subjected to dimensional variations on account of its large capacity to interact with water, which can give rise to lift-off and breaking of the electric contact.

OBJECT OF THE INVENTION

The object of the invention is to provide a fuel cell remedying the drawbacks of the prior art. More particularly, the object of the invention is to propose a fuel cell comprising a plurality of adjacent elementary cells connected in series, implementation of which is facilitated and which is less sensitive to variations of volume of the electrolytic membranes that are liable to occur during operation of said cell.

According to the invention, this object is achieved by the appended claims.

BRIEF DESCRIPTION OF THE DRAWINGS

Other advantages and features will become more clearly apparent from the following description of particular embodiments of the invention, given for non-restrictive example purposes only and represented in the appended drawings, in which.

DESCRIPTION OF PARTICULAR EMBODIMENTS

In a particular embodiment, a fuel cell comprises a plurality of adjacent elementary cells connected in series by connecting elements. The cell is advantageously a planar fuel cell.

Figure 1:
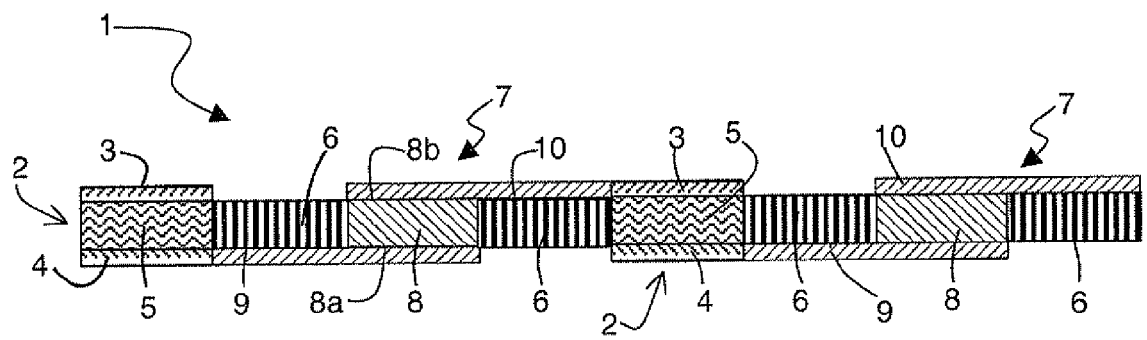
FIGS. 1 and 2 represent fuel cells according to the prior art.
Figure 2:
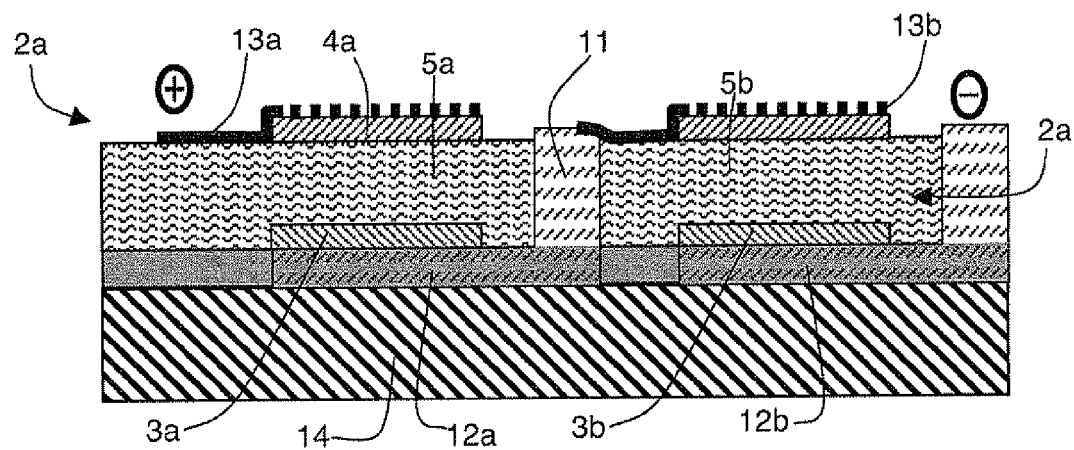
Figure 3:
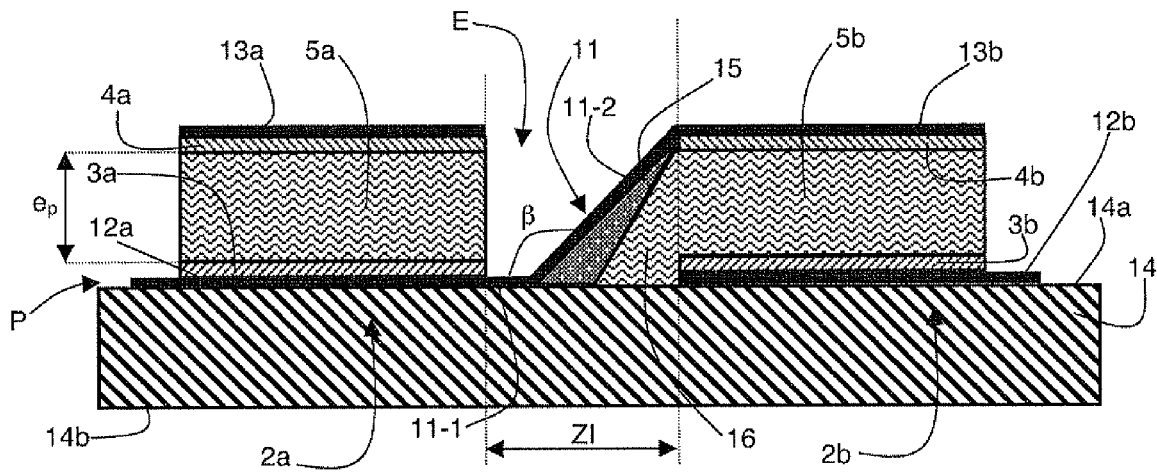
FIG. 3 represents, schematically and in cross-section, a particular embodiment of a cell according to the invention.

Two adjacent elementary cells 2a and 2b arranged on a support 14 are represented in FIG. 3. Support 14 is advantageously porous and presents top and bottom faces 14a and 14b that are preferably flat. Porous support 14 is for example formed by a porous material. It can also be formed by a non-porous material in which channels are drilled. The porosity of the porous material or the size of the channels drilled in the non-porous material is moreover sufficient to enable diffusion of the fluids flowing in the fuel cell and in particular of the fuel fluid. It can further advantageously be located underneath the electrodes only. Support 14 is in addition electrically insulated and advantageously has a thickness comprised between 0.1 mm and 2 mm. It is for example formed by a material chosen from ceramics, polymers, silicon and silicon carbide.

The two cells bear the respective reference numerals 2a and 2b in FIG. 3, cell 2a being the cell located on the left in FIG. 3 (also called first cell) and cell 2b being located on the right in FIG. 3 (also called second cell).

Furthermore, in general manner, in the remainder of the description, the reference numerals followed by the letter "a" apply to the elements constituting cell 2a represented in FIG. 3, whereas the references followed by the letter "b" apply to the elements constituting cell 2b. For reasons of clarity, when the description applies indifferently to either of the two cells 2a and 2b and to the constituent elements thereof, the indices "a" and "b" will be omitted. Thus, for example purposes, cells 2a and 2b and any additional cell will be referenced 2.

Each elementary cell 2 is formed, by successive stacking:
of a first assembly formed by a first current collector 12 and a first electrode 3, for example an anode,
of an electrolytic membrane 5 formed by an electrolytic polymer material and therefore advantageously in solid form and having a thickness advantageously comprised between 10 µm and 500 µm, and preferably between 25 µm and 100 µm, and of a second assembly formed by a second electrode 4, for example a cathode, and a second current collector 13.

The elementary cells are separated from one another by areas called interconnection areas referenced ZI in FIG. 3. An interconnection area presents a width that is able to vary for example from one embodiment to another between 1 µm and 1 cm and preferably between 0.5 mm and 10mm. These areas are areas in which means are in particular arranged for performing electric connection of the first assembly of a cell 2a to the second assembly of the adjacent cell 2b, and more particularly of first current collector 12a of a cell 2a to second current collector 13b of adjacent cell 2b. These means are in particular connecting elements 11 preferably formed by the same electrically conducting material as that forming the first and/or second current collectors of the cells.

Each connecting element 11 located in an interconnection area ZI is separated from the respective electrolytic membranes 5 of the two adjacent cells 2 that it is designed to connect. Thus, unlike the fuel cell described in patent application EP-A-2061114, the connecting element is never in direct contact with the electrolytic membranes. Furthermore, electrolytic membranes 5 of the two adjacent cells 2 are advantageously formed by distinct elements. For one of the two cells (cell 2a in FIG. 3), connecting element 11 is separated from electrolytic membrane 5a by an empty space, whereas for the other cell (cell 2b in FIG. 3), it is separated from electrolytic membrane 5b by a thin barrier layer 15 designed to act as a buffer area for the variations of volume of said membrane 5b when the cell is in operation. Electrolytic membrane 5a of cell 2a thus presents, over the whole of its thickness $e_p$, a side-wall delineating an empty space E with the connecting element 11, whereas thin barrier layer 15 is in direct contact with connecting element 11 and the electrolytic membrane 5b of adjacent cell 2b over the whole thickness $e_p$ of electrolytic membrane 5b.

In particular, thin barrier layer 15 is formed by a polymer material having a lower capacity to absorb water than that of the polymer material constituting the electrolytic membrane 5b of cell 2b. This water absorption capacity of a material can in particular be evaluated by measuring the increase of the water mass of a sample of said concerned material. The ratio between the water absorption capacity of the polymer material of the electrolytic membrane and the water absorption capacity of the polymer material of the thin barrier layer is advantageously strictly greater than 2 and, even more advantageously, greater than 10. In an advantageous mode, thin barrier layer 15 can even be formed by the same polymer material as that forming electrolytic membrane 5b. In this case, electrolytic membrane comprises hydrophilic functions which have been at least partially deteriorated, for example by a selective and at least superficial treatment by plasma, to form the thin barrier layer. In this case, the capacity to absorb water may be gradual in the thickness of the layer forming the membrane and the thin barrier layer. The hydrophilic functions of the polymer material are advantageously chosen from the $-SO_3$, $-COOH$ and $-PO(OH)_2$ groups.

Such a separation of the connecting element with respect to the respective electrolytic membranes of the cells it is designed to connect enables the connecting element to be preserved from variations in volume of said membranes thereby preserving the electric connection between the two adjacent cells.

Figure 4:
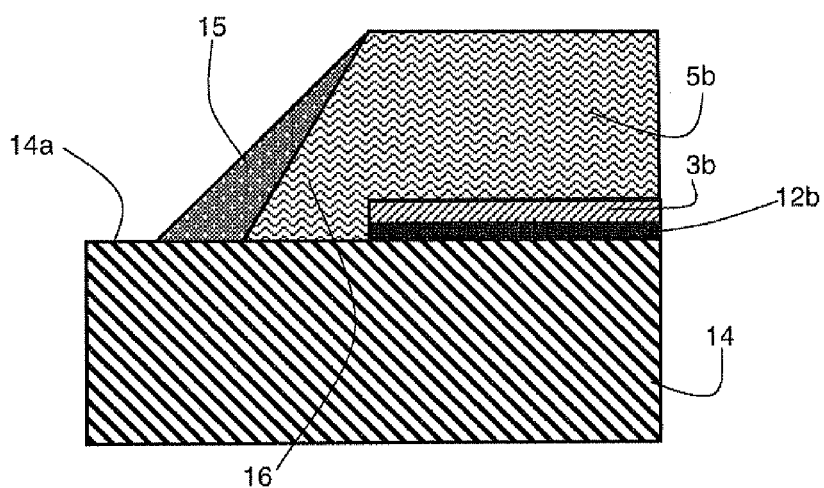
FIG. 4 represents, schematically and in cross-section, an enlargement of the interconnection area of FIG. 3.

In the embodiment represented in FIG. 3 and on the enlargement illustrated in FIG. 4, connecting element 11 located in the interconnection area is formed by a first part 11-1 horizontally extending first collector 12a of cell 2a, itself extended by an inclined second part 11-2, the end of which is in contact with second collector 13b of cell 2b. The inclination angle β, formed in the counter-clockwise direction from second part 11-2 of connecting element 11 up to the main plane P of first collector 12a of cell 2a and of first part 11-1 of connecting element 11, is moreover in advantageous manner an obtuse angle, more particularly different from 90°. It is preferably greater than or equal to 135° and advantageously greater than or equal to 170°. Thus, the fact that second part 11-2 of connecting element 11 is advantageously non-perpendicular with respect to main plane P further enhances the robustness of the fuel cell with respect to the variations in volume of the electrolytic membranes.

In FIG. 3, second part 11-2 of connecting element 11 rests on thin barrier layer 15, itself arranged on an external part 16 of electrolytic membrane 5b of cell 2b. Electrolytic membrane 5b is thus not only located between the two electrodes 3b and 4b of cell 2b, but it also partly extends into interconnection area ZI. This external part 16 rests on top surface 14a of porous support 14 and advantageously comprises a cross-section in the form of a right-angled triangle, in the cutting plane of FIG. 3, the hypotenuse of which triangle is in contact with thin barrier layer 15. Thin barrier layer 15 further advantageously itself presents a cross-section of triangular shape in the same cutting plane, in FIG. 3.

It is in particular the fabrication method used to form this external part 16 of the electrolytic membrane 5b and the thin barrier layer 15 which determines the incline of second part 11-2 of connecting element 11 with respect to the respective main planes of current collectors 12a and 13b (corresponding to the horizontal plane P).

Such a fuel cell thereby circumvents problems of volume variations of the electrolytic membranes made from polymer material when the cell is in operation. The empty space separating connecting element 11 from electrolytic membrane 5a on the one hand and the presence of the thin barrier layer between the connecting element and electrolytic membrane 5b on the other hand do in fact enable the mechanical stresses undergone by the connecting means between two adjacent cells to be attenuated. This thereby enables the cell to be made less sensitive to the volume variations of the electrolytic membranes made from polymer material.

Such a fuel cell also presents the advantage of being easy to fabricate. It is in fact possible to produce the electrolytic membranes of each cell by forming a continuous single thin layer of electrolytic polymer material on the support, and by then at least partially removing the polymer material deposited in the interconnection areas. This avoids making localized depositions of electrolytic polymer material with deposition conditions, which do not enable homogeneous depositions to be made. Furthermore, the empty space on the one hand and the barrier layer on the other hand are also easy to fabricate. The empty space is formed during at least partial removal of the electrolytic material deposited in interconnection areas ZI. The thin barrier layer can furthermore for its part advantageously be fabricated during or just after the removal, using the same processing means, which facilitates implementation of the cell and makes it faster.

Figure 5:
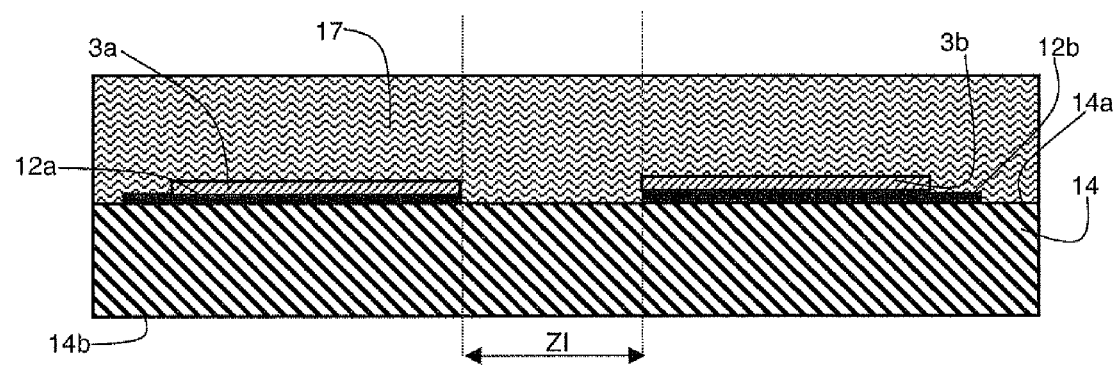
FIGS. 5 to 7 illustrate different steps of performance of a particular embodiment of a fuel cell according to FIG. 3.
Figure 6:
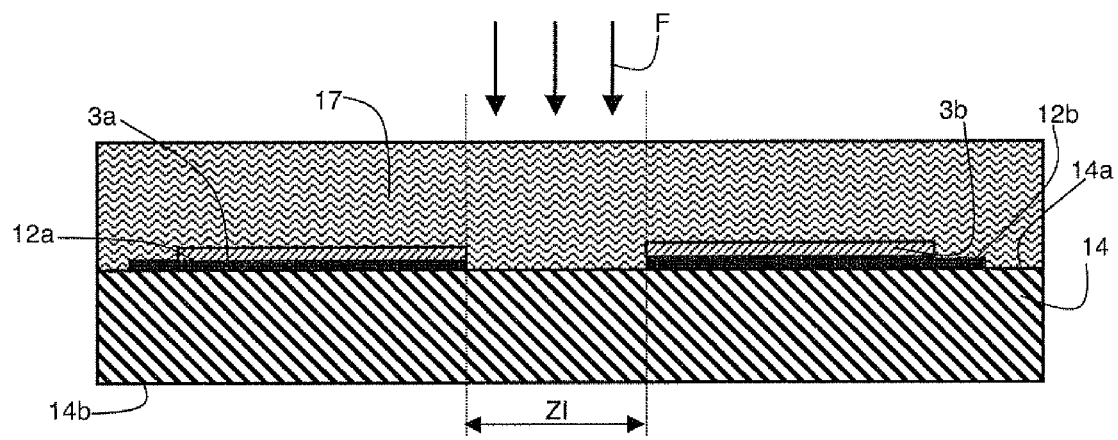
Figure 7:
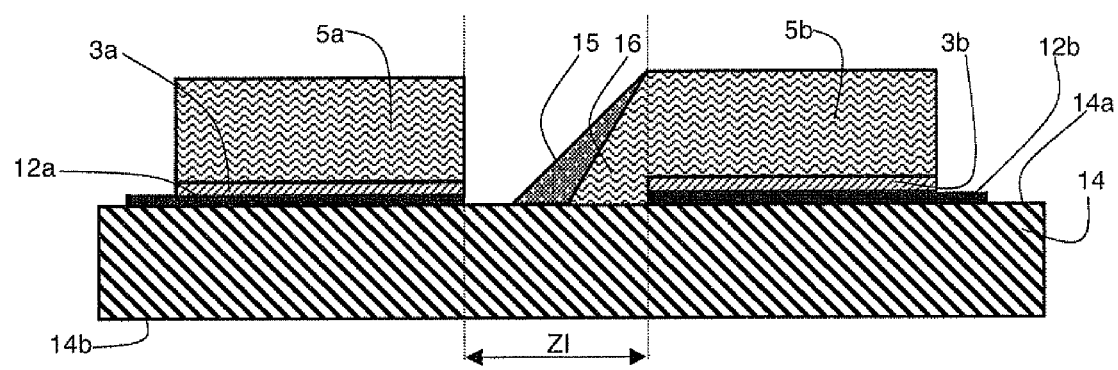
Figure 8:
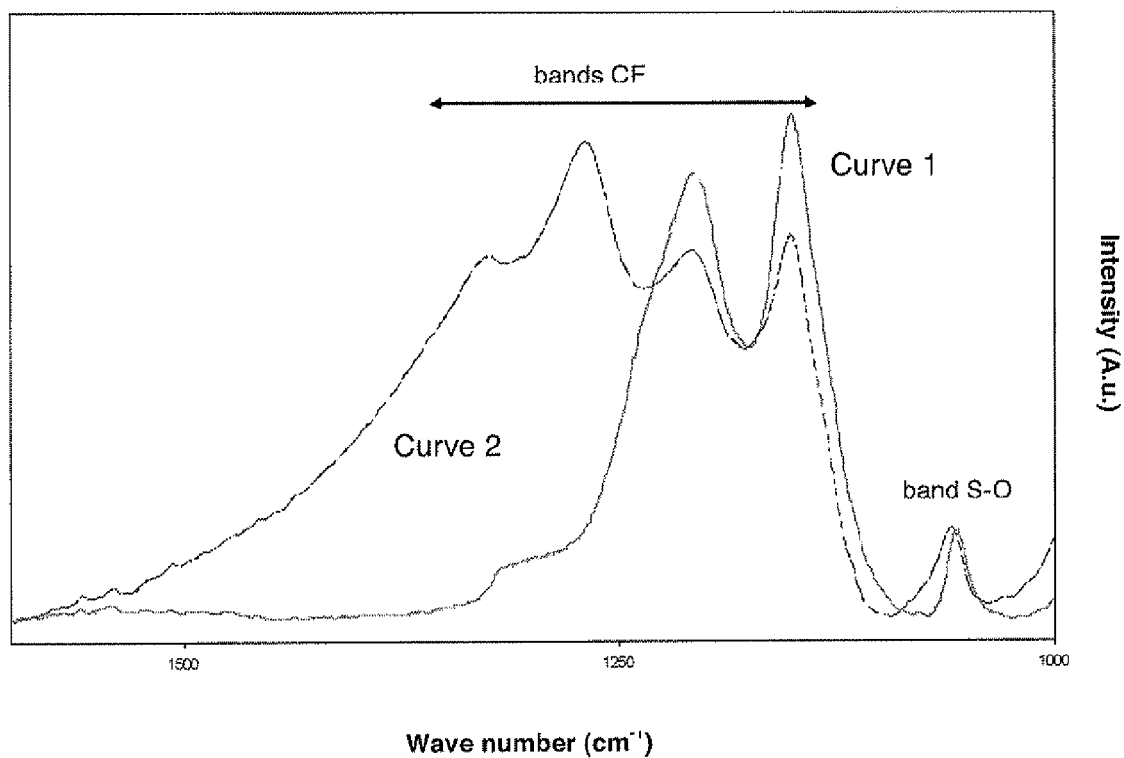
FIG. 8 represents a FTIR spectrum of a polymer material of Nafion® type, with and without treatment by a plasma.

FIGS. 5 to 7 illustrate different steps of a particular embodiment of a fuel cell according to FIG. 3. A continuous thin layer 17 of electrolytic polymer material is deposited on the whole of top surface 14a of support 14. The electrolytic polymer material is for example a polymer presenting hydrophilic functions, such as a fluorinated copolymer comprising sulfonate groups such as the Nafion® polymer marketed by DuPont. It is for example formed by a deposition technique, such as coating, spraying, or plasma enhanced chemical vapor deposition (PECVD).

More particularly, deposited continuous thin layer 17 covers the first assemblies (12 and 3) of each cell 2 formed beforehand on the top surface 14a of support 14, as well as the free areas separating said cells 2a and 2b (areas designed to form interconnection areas ZI). Once continuous thin layer 17 has been deposited, parts of the electrolytic polymer material deposited in interconnection areas ZI are removed in order to delineate the electrolytic membranes of each cell and to form the empty spaces (or vias) designed to separate a membrane 5a of one of cells 2a from connecting element 11.

In particular and as illustrated in FIG. 6, removal in each interconnection area ZI can be a partial removal performed by selective etching by plasma treatment (arrows F in FIG. 6), in order to delineate electrolytic membranes 5a and 5b, with creation of an empty space in said interconnection area ZI. Formation of the empty space is more particularly controlled in order to form said empty space at the edge of interconnection area ZI, so that the side wall of the formed electrolytic membrane 5a is aligned with that of corresponding first current collector 12a and of anode 3a. This further enables a part called non-removed part of electrolytic polymer material to be preserved. This non-removed part presents a cross-section in the advantageous form of a right-angled triangle extending the part of electrolytic membrane 5b arranged on first assembly 12b and 3b of cell 2b. Etching being performed in continuous thin layer 17, a non-removed part presenting a cross-section of right-angled triangle shape can be kept not only for cell 2b but also for cell 2a. This non-removed part on the side where cell 2a is located would thus extend the part of electrolytic membrane 5a located on first assembly 12a and 3a of cell 2a.

In FIGS. 5 to 7, thin barrier layer 15 was made at the same time as the partial removal of the electrolytic polymer material was performed. In this case, plasma treatment not only enables a part of the electrolytic polymer material to be removed to form the empty space and delineate membranes 5a and 5b, but also in simultaneous manner enables to degrade at least on the surface the hydrophilic functions of the polymer material of the non-removed part. This enables to form, in the non-removed part by etching, at least one superficial thin layer forming the thin barrier layer 15 and resting on the remaining non-degraded part of electrolytic membrane 5b (external part 16). The plasma treatment step enabling both etching and chemical modification of the electrolytic polymer material can advantageously be performed in a reactor with parallel electrodes. The reactive gases are injected by a spray shower, which is polarized in a frequency range comprised between low frequencies (400 kHz) and radiofrequencies (13.56 Mhz). The power of the capacitive discharge is preferably comprised between 1 Watt and 1000 Watts. The pressure is advantageously comprised between 0.01 mbar and 1 atm. The pressure is preferably comprised between 0.1 and 1 mbar. The reactive gases are further chosen from argon, oxygen, water, $H_2O_2$, $NO_2$ or a mixture of the gases. The plasma treatment time is further comprised between one second and 1 hour. The treatment time is preferably comprised between 10 and 30 min. Furthermore, it is the etching time and/or the proportion of oxygen in the plasma which enable chemical modification of the material forming thin barrier layer 15 and etching to be achieved: the more these parameters increase, the greater the chemical modification until etching is achieved.

The cathode and second current collector of each cell are then formed on the electrolytic membranes, with formation of connecting element 11 in the interconnection area, on barrier layer 15. Deposition of the connecting element is for example performed by a vacuum deposition operation of metals such as Cu, Au, Ni, Ti and Pt, by cathode sputtering. Deposition can also be performed by depositing an electrically conducting organic material, such as a conducting glue of silicone, epoxy or acrylic type.

For example purposes, a continuous thin layer of Nafion® with a thickness of 26 µm+/−4 µm, made for example by cold coating, was deposited on a silicon substrate on which first assemblies separated by empty areas were previously formed. The first assemblies are formed by an anodic current collector made from gold, with a thickness of 500 nm, and an anode formed by a platinum carbon ink with a thickness of 1 µm.

The continuous thin layer of Nafion® is then treated by a plasma treatment operation enabling the Nafion® to be partially removed in predefined areas and to further form thin barrier layer 15 (by modification of the chemical structure of the surface) in a single operation. The plasma used is a Low Frequency plasma with a water vapor flow of 10 sccm and a helium flow of 150 sccm. The pressure in the plasma treatment enclosure with parallel electrodes is 0.25 mbar and the power is fixed at 300 Watts. The distance between the electrodes is fixed at 20 mm and the treatment time is fixed at 13 minutes. Furthermore, the areas of the continuous thin layer of Nafion® to be treated are not masked so long as the areas to be protected are mechanically masked by means of a stainless steel mask with a thickness of 500 µm. More particularly, the areas to be treated correspond to the areas located in the interconnection areas so long as the areas to be protected correspond to the areas located on the anodes.

FIG. 7 presents a FTIR spectrum of the Nafion electrolyte material respectively before (Curve 1) and after (Curve 2) plasma treatment to form the thin barrier layer. Modification of the peaks is characteristic of modification of the chemical microstructure of the material. A large increase of the proportion of —C—F bonds compared with the —S—O bonds is observed after plasma treatment. The material therefore absorbs less water and deforms less after plasma treatment. In the present case, a deformation of 2% is observed instead of a deformation of 20% after plasma treatment.

Once the thin barrier layer has been made, cathodes, for example formed by a platinum carbon ink with a thickness of 1 µm, are made on the electrolytic membranes and are covered by the second current collectors, and the connecting elements are also made.

Although only two adjacent cells connected by a connecting element 11 are represented in FIG. 3, a cell according to the invention can comprise more than two adjacent cells. In particular, the first collector of cell 2a could be extended by an additional connecting element, not represented in FIG. 3, to connect first current collector 16b of second cell 11b with second current collector of an adjacent additional cell (not represented in FIG. 3). Alternatively, it could also be connected to one of the two terminals of the fuel cell, if second cell 2b was located between an end elementary cell, i.e. one of the cells located at one end of the chain of elementary cells forming the cell. In this case, the additional connecting element is called end connecting element. In the same manner, second collector 13a of first cell 2a can be connected to first current collector of another adjacent cell (not represented in FIG. 3), by means of another connecting element. Second collector 13a can alternatively be connected to the other terminal of the cell, if first cell 11a is one of the end elementary cells.

Formation of thin barrier layer 15 could further be achieved not during, but after, removal of the electrolytic polymer material by selectively and at least superficially treating the non-removed part of the first polymer material by plasma treatment.

The invention claimed is:

1. A fuel cell comprising:
a plurality of elementary cells each successively comprising:
a first assembly formed by a first current collector and a first electrode,
an electrolytic membrane formed by a first polymer material,
and a second assembly formed by a second current collector and a second electrode,
a plurality of connecting elements configured to connect in series the plurality of elementary cells, a first connecting element of the connecting elements being configured to connect the first assembly of a first elementary cell of the plurality of elementary cells to the second assembly of a second elementary cell of the plurality of elementary cells, the first elementary cell being adjacent to the second elementary cell, wherein:
the electrolytic membrane of the first elementary cell has a side wall delineating an empty space with the first connecting element, over a whole thickness of the electrolytic membrane,
and a thin barrier layer, formed by a second polymer material, having a water absorption capacity lower than a water absorption capacity of the first polymer material, is interposed between the first connecting element and the electrolytic membrane of the second elementary cell and is in direct contact with the first connecting element and with the electrolytic membrane of the second elementary cell, over a whole thickness of the electrolytic membrane of the second elementary cell.

2. The cell according to claim 1, wherein each of the connecting elements comprises a first part extending the first current collector of the first assembly of the first elementary cell and a second part connected to the second current collector of the second assembly of the second elementary cell, an inclination angle formed in the counterclockwise direction from the second part of the connecting elements up to the first part of the connecting elements being an obtuse angle.

3. The cell according to claim 2, wherein the inclination angle is greater than or equal to 135°.

4. The cell according to claim 3, wherein the inclination angle is greater than or equal to 170°.

5. The cell according to claim 1, wherein the first elementary cell and second elementary cell are separated by an interconnection area in which there is arranged a stack successively formed by:
an external part of the electrolytic membrane of the second elementary cell,
the thin barrier layer and
one of the connecting elements between the first current collector of the first elementary cell and the second current collector of the second elementary cell.

6. The cell according to claim 5, wherein the external part of the electrolytic membrane of the second elementary cell presents a cross-section in the form of a right-angled triangle wherein the hypotenuse is in contact with the thin barrier layer itself presenting a cross-section of triangular shape in the same cutting plane.

7. The cell according to claim 1, wherein the first polymer material comprises hydrophilic functions and in that the second polymer material is formed by the same polymer as the first polymer material, the hydrophilic functions being at least partially deteriorated in the second polymer material.

8. The cell according to claim 7, wherein the hydrophilic functions are chosen from the $-SO_3$, $-COOH$ and $-PO(OH)_2$ groups.

9. A method for fabricating a fuel cell according to claim 1, comprising:
   forming, on a support, the first assemblies of the first and second elementary cells, the first assemblies being separated from one another by empty areas designed to form interconnection areas,
   forming the electrolytic membranes on the first assemblies of the first and second elementary cells,
   forming the second assemblies on the electrolytic membranes of the first and second elementary cells,
   and fabricating the first connecting element in said interconnection areas, wherein forming the electrolytic membranes is performed by forming a continuous thin layer made from a first polymer material on the support, covering the first assemblies and the interconnection areas, and then by at least partial removal of the first polymer material deposited in the interconnection areas, in order to form the empty spaces, and in that it comprises forming the thin barrier layers made from a second polymer material, in the interconnection areas.

10. The method according to claim 9, wherein removal of the first polymer material in the interconnection areas is a partial removal of said first polymer material performed by a selective etching operation using a plasma.

11. The method according to claim 10, wherein forming the thin barrier layers is performed after partial removal of the first polymer material in the interconnection areas, by selectively and at least superficially treating the non-removed part of the first polymer material by plasma in the interconnection areas.

12. The method according to claim 10, wherein forming the thin barrier layers is performed at the same time as partial removal of the first polymer material in the interconnection areas, by plasma treatment.

* * * * *